United States Patent
Roberts

(10) Patent No.: US 8,818,204 B2
(45) Date of Patent: Aug. 26, 2014

(54) METHODS AND APPARATUS FOR MODULATING LIGHT TO CONCURRENTLY CONVEY HIGH RATE DATA AND LOW RATE DATA

(75) Inventor: Richard D. Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 13/460,224

(22) Filed: Apr. 30, 2012

(65) Prior Publication Data

US 2013/0287403 A1 Oct. 31, 2013

(51) Int. Cl.
*G02F 1/01* (2006.01)

(52) U.S. Cl.
USPC .......................................... 398/182; 359/276

(58) Field of Classification Search
USPC ........................................................ 398/130
See application file for complete search history.

(56) References Cited

U.S. PATENT DOCUMENTS

| 5,394,259 | A | * | 2/1995 | Takahara ....................... | 398/108 |
|---|---|---|---|---|---|
| 5,600,471 | A | | 2/1997 | Hirohashi et al. | |
| 6,941,076 | B1 | * | 9/2005 | Adams et al. .................. | 398/130 |
| 8,238,014 | B2 | * | 8/2012 | Kucharski et al. ............. | 359/238 |
| 8,588,621 | B2 | * | 11/2013 | Dahan et al. ................... | 398/186 |
| 8,665,508 | B2 | * | 3/2014 | Kucharski et al. ............. | 359/238 |
| 2006/0239689 | A1 | * | 10/2006 | Ashdown ....................... | 398/130 |
| 2006/0269287 | A1 | * | 11/2006 | Bidmead et al. ............... | 398/130 |
| 2009/0208221 | A1 | * | 8/2009 | Sasai .............................. | 398/130 |
| 2009/0243815 | A1 | * | 10/2009 | Tolli .......................... | 340/310.11 |
| 2010/0060972 | A1 | * | 3/2010 | Kucharski et al. ............ | 359/290 |
| 2010/0309958 | A1 | | 12/2010 | Lakkis | |
| 2011/0075581 | A1 | | 3/2011 | Mihota | |
| 2011/0144941 | A1 | | 6/2011 | Roberts | |
| 2012/0162633 | A1 | | 6/2012 | Roberts | |
| 2012/0315036 | A1 | * | 12/2012 | Kucharski et al. .............. | 398/43 |
| 2013/0170841 | A1 | * | 7/2013 | Liu et al. ........................ | 398/183 |

FOREIGN PATENT DOCUMENTS

| EP | 2106041 A1 | 9/2009 |
|---|---|---|
| EP | 1436952 B1 | 11/2011 |
| WO | 2012/087944 A2 | 6/2012 |

OTHER PUBLICATIONS

Roberts, et al., "Methods and Arrangements for Frequency Shift Communications by Undersampling", PCT Patent Application No. PCT/US2011/060578, filed on Nov. 14, 2011, 33 Pages.

Roberts, Richard R., "Methods and Arrangements for Frequency Shift Communications", PCT Patent Application No. PCT/US2011/054441, filed on Sep. 30, 2011, 23 Pages.

Roberts, et al., "Methods and Arrangements for Error Correction in Decoding Data From an Electromagnetic Radiator", U.S. Appl. No. 13/539,354, filed Jun. 30, 2012, 45 Pages.

(Continued)

*Primary Examiner* — Ken Vanderpuye
*Assistant Examiner* — Amritbir Sandhu
(74) *Attorney, Agent, or Firm* — Garrett IP, LLC

(57) ABSTRACT

A light transmitter receives a low-rate data signal having a low data rate and a high-rate data signal having a high data rate that is greater than the low data rate. The transmitter includes a light source and a light modulator to modulate the light source based on logic levels of the high-rate data signal and logic levels of the low-rate data signal, to produce modulated light that concurrently conveys the logic levels of the low-rate data signal and the logic levels of the high-rate data signal.

18 Claims, 8 Drawing Sheets

(56) References Cited

OTHER PUBLICATIONS

Roberts, et al., "Methods and Arrangements for Generating a Waveform for Frequency Shift Keying Communications", U.S. Appl. No. 13/539,351, filed Jun. 30, 2012, 47 Pages.

Daisuke, et al., "A Hybrid and Linear Registration Method Utilizing Inclination Constraint", ISMAR '05 Proceedings of the 4th IEEE/ACM International Symposium on Mixed and Augmented Reality, pp. 140-149.

Yoshino, et al., "High-accuracy Positioning System using Visible LED Lights and Image Sensor", 1-4244-1463-6/08 RWS 2008 IEEE, pp. 439-442.

Tanaka, et al., "New Position Detection Method using Image Sensor and Visible Light LEDs", IEEE Second International Conference on Machine Vision, Dec. 28-30, 2009, pp. 150-153.

Horikawa, et al., "Pervasive Visible Light Positioning System using White LED Lighting", vol. 103; No. 721(CS2003 178-197), 2004, pp. 93-99.

Wikipedia, "Rotation matrix", From Wikipedia, the free encyclopedia; Available at: http://en.wikipedia.org/wiki/Rotation_matrix, pp. 1-22.

Roberts, et al., "Methods and Apparatus for Multiphase Sampling of Modulated Light", U.S. Appl. No. 13/630,066, filed Sep. 28, 2012, 71 Pages.

Roberts, Richard R., "Location Detection System", PCT Patent Application No. PCT/US2011/62578, filed on Nov. 30, 2011, 51 Pages.

Gopalakrishnan, et al., "Location Based Technology for Smart Shopping Services", PCT Patent Application No. PCT/US2011/067749, filed on Dec. 29, 2011, 18 Pages.

International Search Report and Written Opinion received for Patent Application No. PCT/US2011/060578, mailed on Mar. 15, 2012, 10 pages.

International Search Report and Written Opinion received for Patent Application No. PCT/US2011/054441, mailed on Apr. 23, 2012, 11 pages.

\* cited by examiner

METHODS AND APPARATUS FOR MODULATING LIGHT TO CONCURRENTLY CONVEY HIGH RATE DATA AND LOW RATE DATA

BACKGROUND

In a communication system, a light modulator may amplitude modulate a light source based on a data signal, and the resulting modulated light, which conveys the data signal, is transmitted to a distant light receiver. In some situations it is advantageous to be able to transmit multiple data signals with different data rates, simultaneously. A conventional light modulator is limited in that it is not capable of simultaneously amplitude modulating a light source with such data signals having the different data rates. Instead, multiple conventional light modulators must be operated in parallel each to transmit a different one of the data signals. This wastes power and increases costs.

BRIEF DESCRIPTION OF THE DRAWINGS/FIGURES

Figure 1:
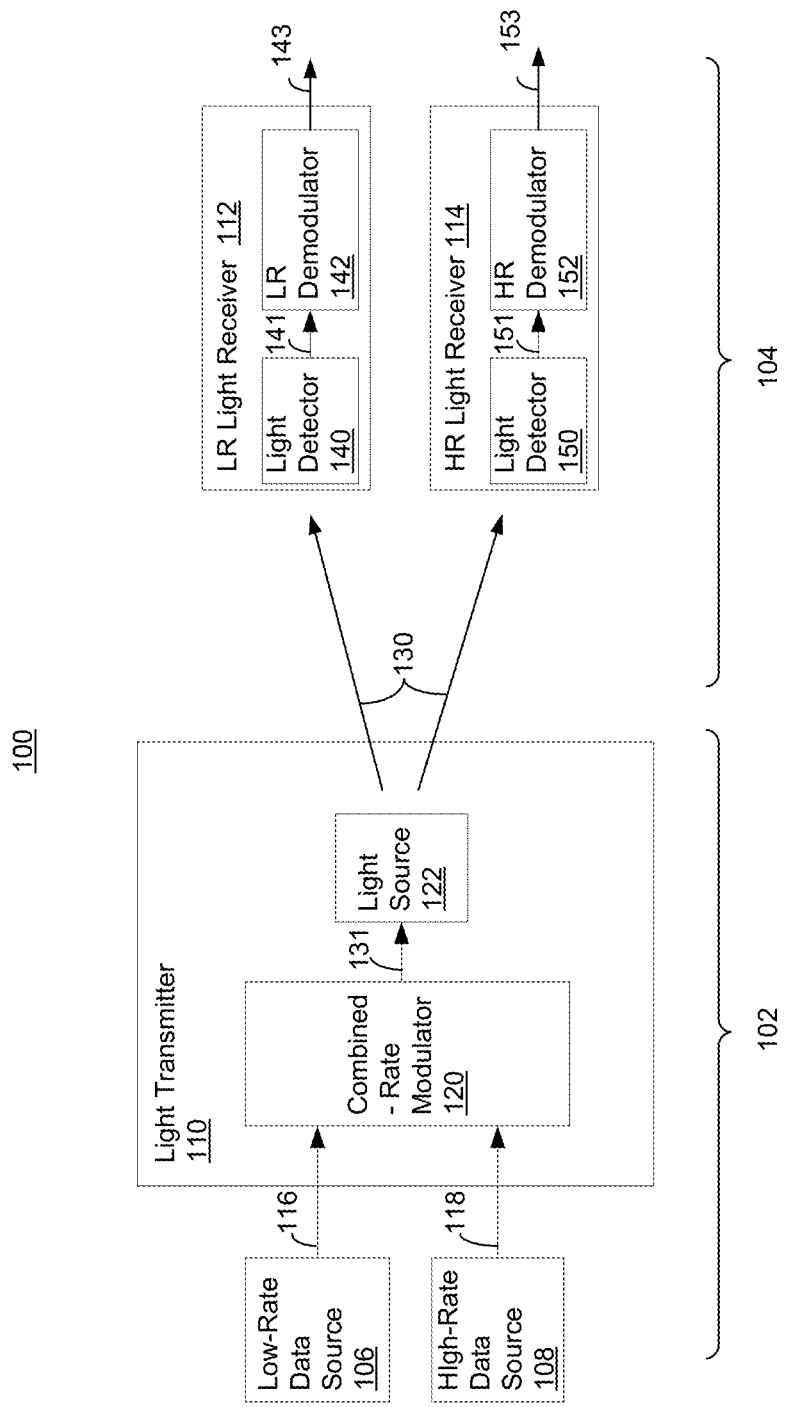
FIG. 1 is an embodiment of a system in which light is modulated to convey a low-rate data signal and a high-rate data signal, concurrently.

In the drawings, the leftmost digit(s) of a reference number identifies the drawing in which the reference number first appears.

DETAILED DESCRIPTION

FIG. 1 is a system 100 in which light is modulated to produce a modulated light signal that concurrently conveys a low-rate (LR) data signal and a high-rate (HR) data signal, according to an embodiment. System 100 includes a transmit end 102 and a receive end 104. Transmit end 102 includes a LR data source 106, a HR data source 108, and a light transmitter 110. Receive end 104 may include a LR light receiver 112 and a high rate light receiver 114.

On transmit end 102, LR data source 106 transmits to light transmitter 110 a data signal 116 (also referred to herein as a "LR data signal 116") having a low data rate. Also, HR data source 108 transmits to light transmitter 110 a data signal 118 (also referred to herein as a "HR data signal 118"), having a high data rate relative to the low data rate of LR signal 116.

Light transmitter 110 includes a light modulator 120 (also referred to herein as a "combined-rate modulator 120" or a "modulator 120") coupled to a light source 122, which may be, e.g., a light emitting diode (LED) to emit visible light. In other embodiments, light source 122 may emit light at non-visible frequencies, including infrared and ultraviolet light frequencies. Combined-rate modulator 120 receives LR data signal 116 and HR data signal 118, and modulates light source 122 based on the logic levels of the HR data signal and corresponding logic levels of the LR data signal, so as to produce modulated light 130 that concurrently conveys or carries both the logic levels of the LR data signal and the corresponding logic levels of the HR data signal. More specifically, modulator 120 generates a modulation signal 131, at a modulation rate that is at least as high as the high data rate, having amplitude modulation states or levels that are based on the logic levels of the of LR data signal 116 and the corresponding logic levels of HR data signal 118. Modulator 120 amplitude modulates light source 122 based on amplitude modulation signal 131. Light transmitter 110 transmits modulated light 130, which concurrently carries or conveys LR data signal 116 and HR data signal 118, to receive end 104.

In embodiments, LR data source 106 and HR data source 108 may each include a processor-based device such as a desktop computer, a notebook, a laptop, a Netbook, a smartphone, a server, or the like that is capable of transmitting LR data signal 116 and HR data 118, respectively, to light transmitter 110. Each of LR data source 106 and HR data source 108 may be integrated with light transmitter 110. Also, LR data source 106, or HR data source 108, and light transmitter 110 may be integrated and serve as parts of another device. LR and HR data sources 106, 108 may be the same device. HR data source 108 may transmit HR data signal 118 at exemplary high data rates in a range of approximately 50 kilo-bits-per-second (kbps) to 1000 kbps (i.e., 1 mega-bit-per-second (Mbps)), although HR data signal 118 may have rates that are either less than 50 kbps or greater than 1000 kbps. HR data 118 may include packet data transmitted at the high data rate. LR data signal 116 may have a data rate ranging from a few bps, e.g., 15 bps, to near the data rate of HR data signal 118, so long as the data rate of the LR data signal is less than the data rate of the HR data signal. LR data signal rates as low as a few bps are useful in position determining applications that require light source 120 to transmit, e.g., light source identification numbers, and other related information.

At receive end 104, LR light receiver 112 and HR light receiver 114 receive modulated light 130. LR light receiver 112 includes a light detector 140, such as a photodiode, to convert received light 130 to an electrical signal 141, and a LR demodulator 142 to demodulate the electrical signal, so as to produce a demodulated signal 143 comprising the original logic levels of LR data signal 116 from LR data source 106. HR light receiver 114 includes a light detector 150, such as a photodiode, to convert received light 130 to an electrical signal 151, and a HR demodulator 152 to demodulate the electrical signal, so as to produce a demodulated signal 153 comprising the original logic levels of HR data signal 118 from HR data source 108.

Figure 2:
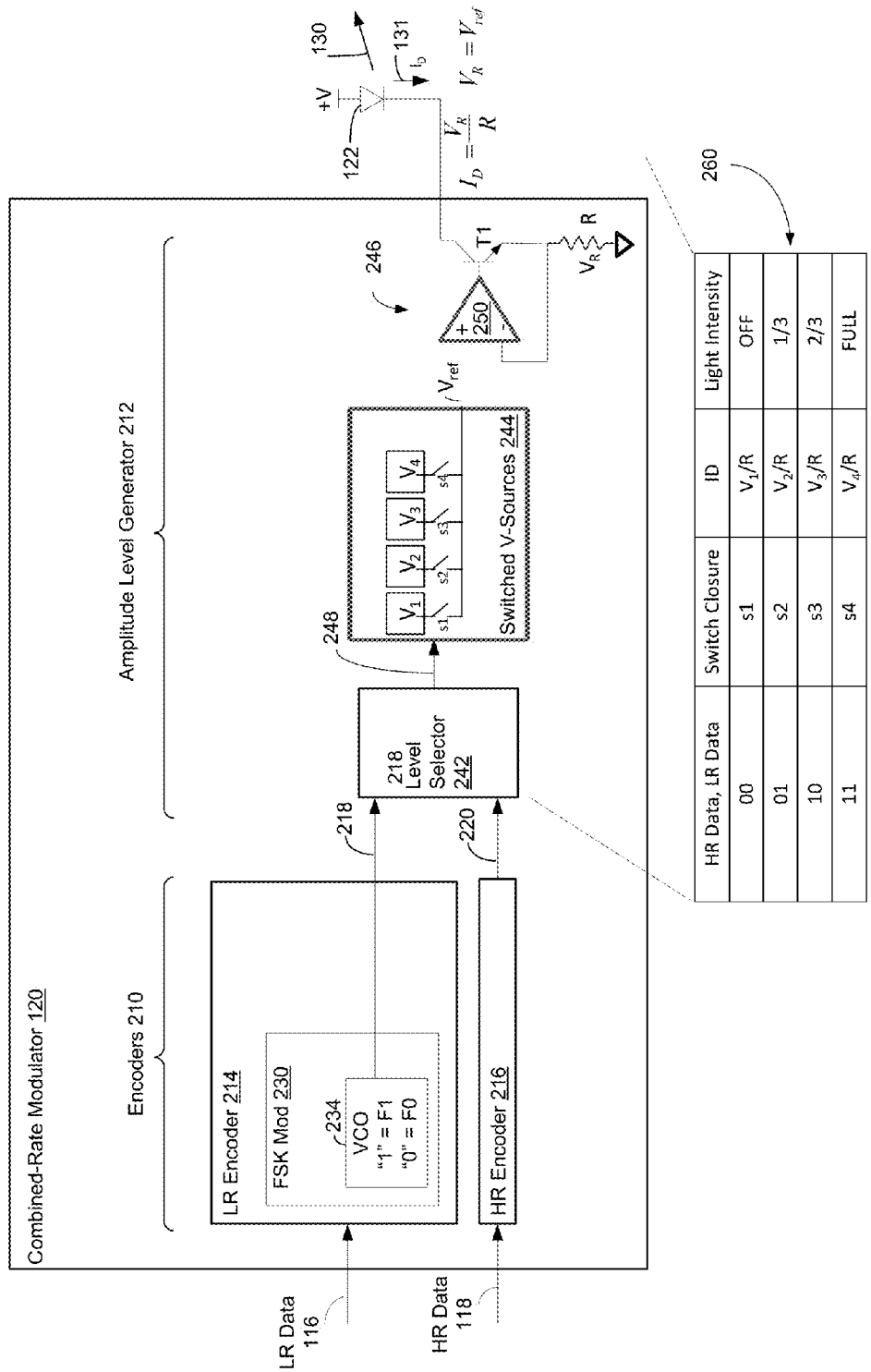
FIG. 2 is an embodiment of a combined-rate light modulator from FIG. 1, which modulates a light source.

FIG. 2 is an embodiment of combined-rate modulator 120 from FIG. 1, which modulates light source 122. Combined-Rate modulator 120 includes encoders 210, followed by an amplitude level or state generator 212. Encoders 210 include a LR encoder 214 to encode LR data signal 116 into a LR encoded signal 218 representative of the logic levels in the LR data signal, and a HR encoder 216 to encode HR data signal 118 into a HR encoded signal 220 representative of the logic levels of the HR data signal.

In a low-rate FSK encoding embodiment, LR encoder 214 may include an FSK modulator 230 to encode LR data signal 116 into a Frequency Shift ON-OFF Keying (FSOOK) signal 218 based on the logic levels of the LR data signal 116. FSK modulator 230 generates encoded signal 218 at distinct frequencies representing corresponding distinct logic levels of LR data signal 116. FSK modulator 230 may include a voltage-controlled oscillator (VCO) 234. VCO 234 may receive a voltage representative of, e.g., a logic 1 of LR data signal 116, such as five volts direct current (VDC) and, in response, may generate the output signal 218 at a frequency F1, such as 105 Hz, representative of the logic 1. VCO 234 may then receive a voltage representative of, e.g., a logic 0 of LR data signal 116, such as zero volts and, in response, may generate output signal 218 at a frequency F0, such as 120 Hz, representative of the logic 0.

In the low-rate FSK encoding embodiment, FSK modulator 230 may generate each of frequencies F0 and F1 of FSK signal 218 as a substantially rectangular, or ON-OFF keying, waveform, where ON represents a logic 1 of the FSK waveform, and OFF represents a logic 0 of the FSK waveform. Also, the frequencies F0 and F1 of the rectangular FSK waveform may be related to a bit period of each of the bits of LR data signal 116 such that an integer number, k, of cycles or periods of the rectangular FSK waveform at each of frequencies F0 and F1 matches the bit period of LR data signal 116, as will be discussed more fully below in connection with FIG. 3. Each half cycle of the above-mentioned FSK waveform that is ON is referred to as a "chip" of the FSK waveform. In this manner, distinct logic levels of LR data signal 116 may be encoded as distinct numbers k of FSK waveform cycles (and chips), which is useful for purposes of demodulating light signal 130 after it has been transmitted to and received at receive end 104.

Figure 3:
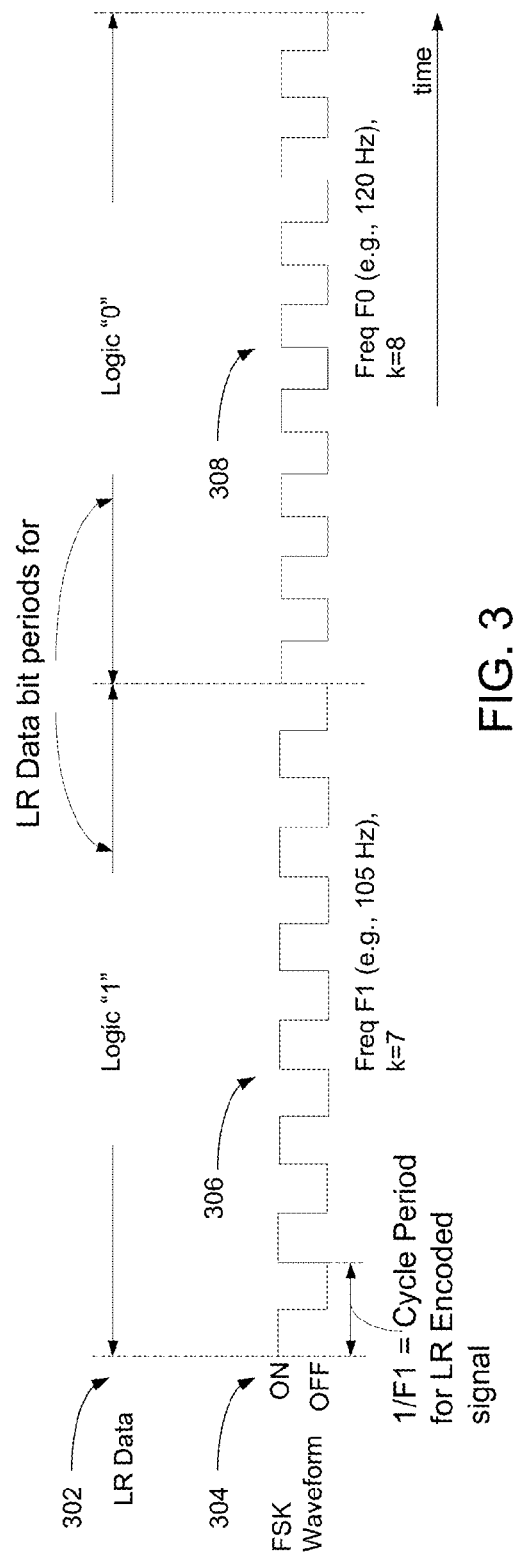
FIG. 3 is an illustration of an example timing relationship between a low-rate data signal, and a corresponding frequency shift keying (FSK) waveform produced by an FSK modulator responsive to the low-rate data signal.

FIG. 3 is an illustration of an example timing relationship between consecutive bits in a LR data signal 302 corresponding to LR data signal 116, and an FSK waveform 304 corresponding to FSK signal 118 that is produced by FSK modulator 230 responsive to the bits of LR data signal 302. LR data signal 302 includes consecutive LR data bits, namely, a logic 1 followed by a LR logic 0, each extending the duration of a LR data bit period. In response to the LR data bits 1, 0, FSK modulator 230 first generates an ON-OFF keying waveform 306 at frequency F1 (e.g., 105 Hz) to represent the logic 1 LR data bit, and then an ON-OFF keying waveform 308 at frequency F0 (e.g., 120 Hz) to represent the logic 0 LR data bit. The relationship between frequencies F0 and F1 and the LR data bit period is such that (i) waveform 306 at frequency F1 includes seven full cycles or periods (and chips), i.e., k=7, during the first LR data bit period, and (ii) waveform 308 at frequency F0 includes eight full cycles (and chips), i.e., k=8, during the second LR data bit period. In other words, over the LR data bit period, eight cycles/chips of LR encoded signal 218 represent a logic 0, while seven cycles/chips represent a logic 1.

HR encoder 216 encodes HR data signal 118 into HR encoded signal 220 such that the HR encoded signal 220 has a rate that is at least as high as the high data rate. The rate of encoded signal 220 is also greater than the frequency (e.g., frequencies F0, F1, etc.) of LR encoded signal 218. HR encoder 216 may encode the logic levels (i.e., bits) of HR data 118 into edge transitions, i.e., rising or falling edges, of HR encoded signal 220. For example, HR encoder 216 may be a Manchester encoder to Manchester encode HR data signal 118, to produce HR encoded signal 220 as a Manchester encoded signal. Manchester encoding may be in accordance with the Institute of Electrical and Electronics Engineers (IEEE) 802.3 standard, wherein a logic 0 of HR data signal 118 is encoded as a downward logic transition (i.e., falling-edge) positioned mid-bit of the logic 0, while a logic 1 of HR data signal 118 is encoded as an upward mid-bit transition (i.e., rising edge), and wherein the rate of the Manchester encoded signal is twice the high data rate, i.e., twice the rate of the HR data signal 118.

Amplitude level generator 212 receives LR encoded signal 218 and HR encoded signal 220, and generates modulation signal 131 having distinct amplitude modulation levels or states that are based on the logic levels of the LR encoded signal and concurrent corresponding logic levels of the HR encoded signal. Amplitude level generator 212 may include an amplitude level selector 242, switched voltage-sources (or V-sources) 244, and a current driver 246, that operate together to generate modulation signal 131.

Level selector 242 receives LR encoded signal 218 and HR encoded signal 220, and generates a switch selection signal 248 including distinct amplitude modulation states, corresponding to amplitude modulation levels, based on the logic levels of the LR encoded signal and the corresponding concurrent logic levels of the high rate data signal. Level selector 242 generates the distinct amplitude modulation states in switch selection signal 248 at a rate equal to the rate of HR encoded signal 220. In an embodiment, level selector 242 operates in the following manner. As the encoded logic levels of each of LR and HR encoded signals 218, 220 stream from encoders 214, 216 in parallel into level selector 242, the level selector combines into a bit pair each logic level (i.e., logic 0 or 1) of the LR encoded signal with a corresponding concurrent logic level (e.g., logic 0 or 1) of the HR encoded signal, to produce a stream of bit pair combinations each representing a distinct amplitude modulation state or level in switch selection signal 248. Exemplary LR, HR encoded bit pair combinations include 00, 01, 10, 11, representing four corresponding amplitude modulation states or levels, as will be discussed in more detail below. In another embodiment, LR and HR encoded signals 216, 218 do not stream in parallel to level selector 242, rather LR and HR encoders 214, 216, transmit LR and HR encoded signals 218, 220 as alternating packets of LR and HR encoded bits, and selector 242 buffers the packets before combining each LR encoded bit with a corresponding HR encoded bit into an amplitude modulation state.

Switched voltage sources 244 may include multiple, selectively switched voltage sources V1-V4 each to provide a corresponding voltage, to a common voltage output Vref, through a corresponding one of switches s1-s4. Switch selection signal 248 from level selector 242 controls the closure of switches s1-s4. In switch selection signal 248, each of the amplitude modulation states, e.g., which may be represented as concurrent LR, HR encoded bit pair combinations, closes a corresponding one of switches s1-s4. For example, LR, HR concurrent bit pair combinations 00, 01, 10, and 11 generated at level selector 242 respectively cause the closure of switches s1, s2, s3, s4, which, in turn, results in respective signal levels V1, V2, V3, and V4 for Vref at the output of switched voltage sources 244. Thus, a rate of change of Vref is matched to the rate of change of the modulation states in switch selection signal 248, namely, the rate of HR encoded signal 220, which is at least as high as the high data rate.

Current driver 246 generates amplitude modulation signal 131 as a current $I_D$ to drive light source 122, which may be a light-emitting diode capable of being intensity/amplitude modulated responsive to changes in current $I_D$. Current driver 246 may include an operational amplifier 250 having an input thereof driven by Vref, a transistor T1 having its base driven by an output of the operational amplifier, and a resistor R connected with the transistor emitter, all of which operate together to convert Vref to current $I_D$, where $I_D$=Vref/R. As Vref takes on different ones of values V1-V4, current $I_D$ takes on corresponding different values Vref/R, thus causing light source 122 to generate light 130 at different corresponding intensities. That is, the current $I_D$ amplitude/intensity modulates light 130 according to the amplitude modulation levels/states generated by level selector 242 and switched voltage sources 244. In an exemplary embodiment, voltages V1, V2, V3, and V4, and the resistance R (and thus modulation current $I_D$) may be chosen such that concurrent HR, LR encoded bit combinations 00, 01, 10, and 11, respectively generate relative light intensity modulation levels of OFF, ⅓ ON, ⅔ ON, and FULL ON, as represented in Table 260 in FIG. 2. In other embodiments, different light intensities may be assigned to the bit combinations. Modulation signal 131 has a rate of change equal to the rate of change of Vref, i.e., the rate of the HR encoded signal 220, which is at least as high as the high data rate.

Figure 4:
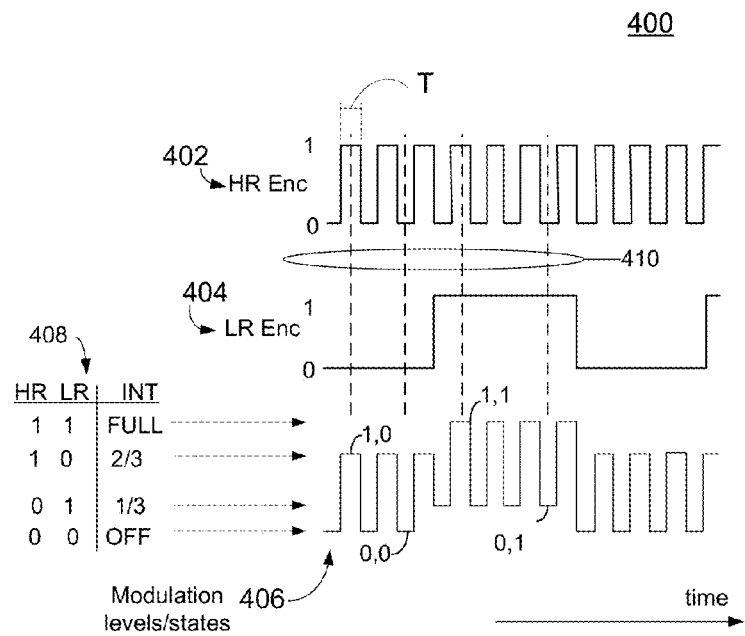
FIG. 4 is an illustration of example timing relationships between various signals from FIG. 2.

FIG. 4 is an illustration of example timing relationships 400 for various signals described above. Example waveforms 402 and 404 respectively represent HR encoded signal 220 ("HR Enc") and LR encoded signal 218 ("LR Enc") from encoders 216 and 214. HR encoded waveform has a bit period T indicated in FIG. 4. An example waveform 406 is an amplitude modulation waveform that may represent any of signals Vref, modulation signal 131 (e.g., current $I_D$), and the intensity of modulated light 130. An exemplary table 408 in FIG. 4 summarizes how the corresponding HR, LR encoded logic levels translate to light amplitude/intensity modulation levels of waveform 406. Each of vertical dashed lines 410 intersects a logic level of LR encoded waveform 404 and a corresponding concurrent logic level of HR encoded waveform 402. For example, the left-most dashed line intersects HR logic level 1 and its corresponding concurrent LR logic level 0, resulting in an amplitude modulation state of 1,0, and a corresponding amplitude modulation level of ⅔ ON. The next dashed line intersects HR logic level 0 and its corresponding concurrent LR logic level 0, resulting in an amplitude modulation state of 0,0, and a corresponding amplitude modulation level of OFF, and so on. Modulation waveform 406 may be considered a composite or combined waveform of HR and LR encoded logic levels.

Other light modulation embodiments are possible. That is, the logic levels of LR encoded signal 218 may be combined with the corresponding logic levels of HR encoded signal 220 in many different ways to produce different amplitude modulation signals having different numbers of distinct amplitude levels. For example, the HR encoded bits (logic levels) may be combined only with LR encoded bits (logic levels) that are logic 1, i.e., ON, as depicted in FIG. 5

Figure 5:
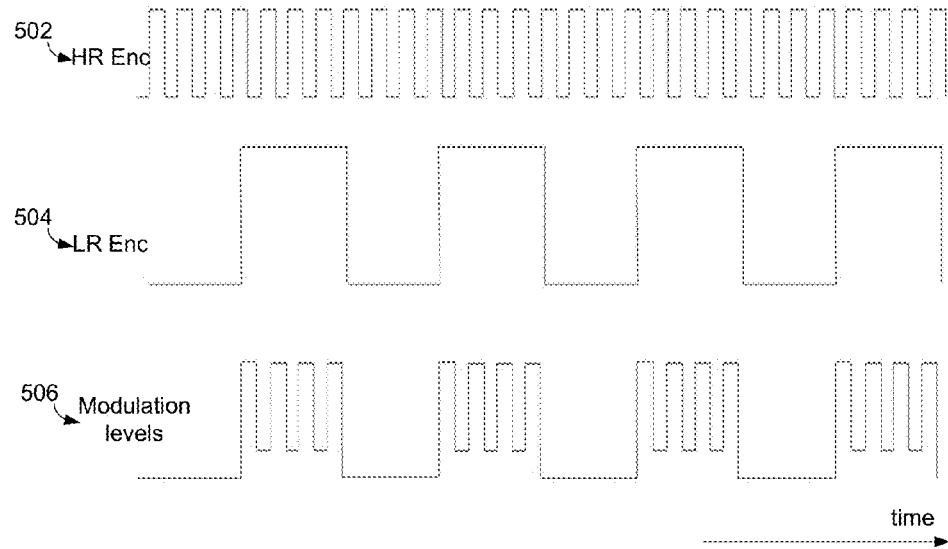
FIG. 5 is an illustration of a timing diagram corresponding to a modulation embodiment in which high-rate encoded bits are burst-combined with low-rate encoded bits only during low-rate bit ON times (i.e., when the low-rate bits are a logic 1).

FIG. 5 is an illustration of an example timing relationship in which HR encoded bits are burst-combined with the LR encoded bits only during the ON time of the LR encoded bits, to produce a light amplitude modulation signal. Waveforms 502, 504 respectively represent HR and LR encoded signals 220, 218, and waveform 506 represents an amplitude modulation waveform resulting from burst-combining the logic bits of the HR encoded waveform with only the ON or logic 1 logic bits of the LR encoded waveform. Modulation waveform 506 may represent any of signals Vref, modulation signal 131 (e.g., current $I_D$), and the intensity of modulated light 130. In this embodiment, modulation waveform 506 has three distinct amplitude levels representing the three possible bit combinations resulting from the HR encoded waveform 502 (logics 0 and 1) and only the logic 1 of the LR waveform 504. Modulation waveform 506 is an example of an amplitude shift keying waveform.

From the description above, it is understood that the amplitude levels of modulated signal 131 are generated based on logic levels of LR encoded signal 218 and corresponding logic levels of HR encoded signals 220. Each of the amplitude levels concurrently conveys or carries the corresponding, concurrent logic levels of the LR and HR encoded signals 218, 220. It is also understood that the logic levels of LR and HR encoded signals 218, 220 are respectively based on corresponding logic levels of LR and HR data signals 116, 118. Therefore, it follows that the amplitude levels of modulated signal 131 are also generated based on logic levels of LR data signal 116 and corresponding logic levels of HR data signal 116 (through their respective intermediary HR and LR encoded signals). Therefore, each of the amplitude levels concurrently conveys or carries the corresponding, concurrent logic levels of the LR and HR data signals 116, 118.

Figure 6:
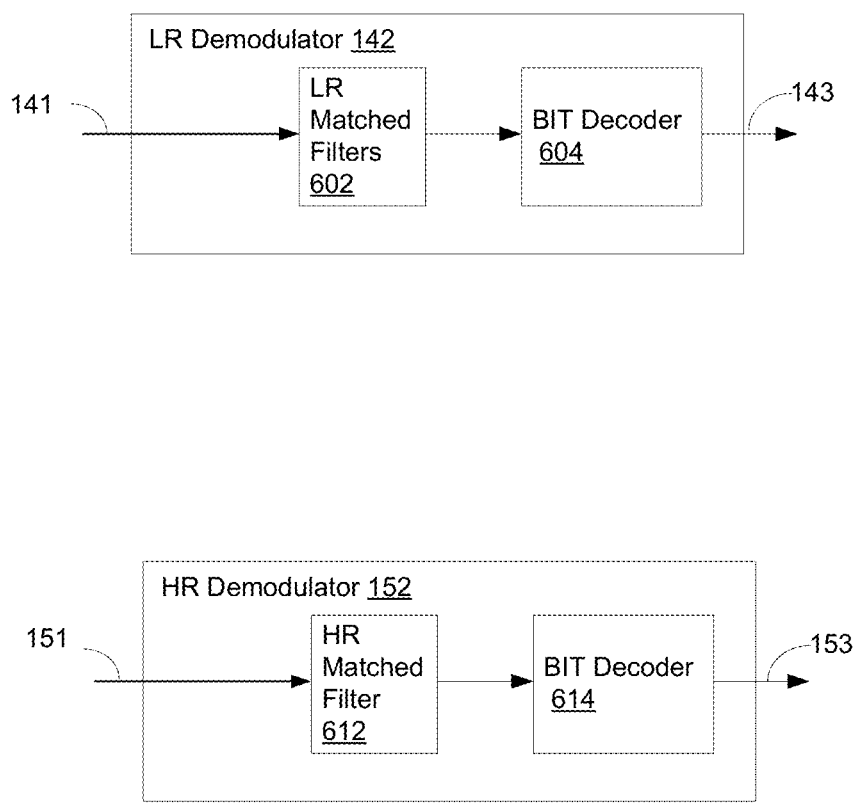
FIG. 6 is a block diagram of a low-rate demodulator in a low-rate light receiver, and a high-rate demodulator in a high-rate receiver from FIG. 1, according to an embodiment.

FIG. 6 is a block diagram of LR demodulator 142 in LR light receiver 112, and HR demodulator 152 in HR light receiver 114, according to an embodiment. LR demodulator 142 includes LR matched filters 602 followed by a bit decoder 604. LR matched filters 602 may include a set of parallel integrate-and-dump circuits each having an integration and sample time ideally matched to a corresponding half chip period of the different FSK frequencies (e.g., F0, F1) of LR encoded signal 218, so as to recover the corresponding matched FSK frequency. For example, FSK frequency F0 of 120 Hz has a corresponding half chip period, and thus a matched integration time, of approximately 4 milliseconds (ms).

Each of matched filters 602 recovers a set of k (e.g., k=7 for logic 1, or k=8 for logic 0) pulses over each of the bit periods of LR data signal 116 depending on the FSK frequency to which the filter is matched, and provides the k pulses to bit decoder 604. Bit decoder 604 decodes the number of pulses, k, received from matched filters 602 into a logic level, e.g., logic 0 or logic 1, of recovered LR data signal 143, which represents a corresponding logic 0 or logic 1 of LR data signal 116. In an embodiment, LR demodulator 142 may be implemented as part of a handheld device, such as a smart phone, having a camera with an image capture frame rate of, e.g., 30 frames per second. In such an embodiment, the camera image exposure time, which corresponds to the matched filter integration time discussed above, is limited by camera settings. Therefore, the ideal matched filter integration time may not be realizable. For example, the ideal matched filter integration time for an FSK frequency F0 of 120 Hz is a half chip period of approximately 4 ms. However, a typical camera image exposure time may be set as low as 0.1 ms, to avoid over exposure in high light intensity environments. Such a mismatch, while not optimum, would not prevent the LR demodulator from recovering the LR data signal.

HR demodulator 152 includes a HR matched filter 612 and a bit decoder 614. HR matched filter 612 may include an integrate-and-dump circuit having an integration and sample time matched to a half bit period of the rate of HR encoded signal 220. Matched filter 612 recovers pulses to which the filter is matched, and provides the recovered pulses to bit decoder 604. In an embodiment where HR data signal 118 is Manchester encoded, the pulses recovered from matched filter 612 indicate bits in HR data signal 118. Bit decoder 614 decodes the pulses into logic levels, e.g., logic 0, 1, of recovered HR data signal 153, which represent corresponding logic levels, e.g., 0, 1, of HR data signal 116. In the Manchester encoding embodiment, bit decoder 614 includes a Manchester decoder.

Figure 7:
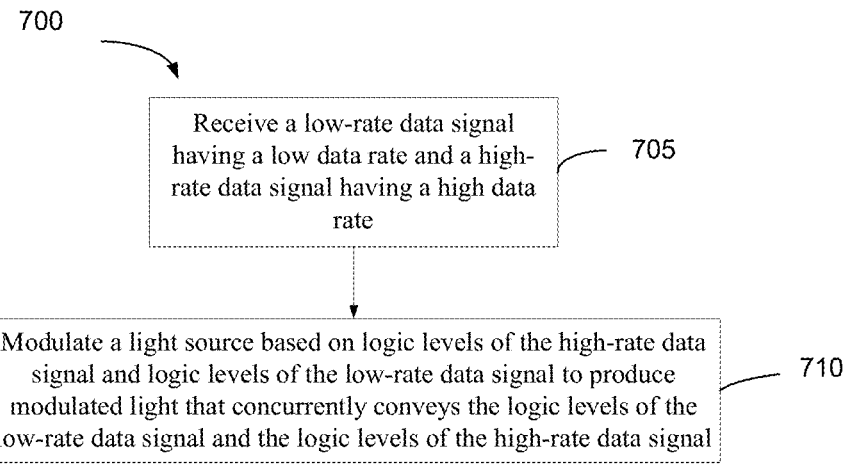
FIG. 7 is a flowchart of a method of modulating a light signal to concurrently convey a low-rate data signal and a high-rate data signal, according to an embodiment.

FIG. 7 is a flowchart of a method 700 of modulating a light signal to concurrently convey a LR data signal and a HR data signal, according to an embodiment.

At 705, a LR data signal having a low data rate and a HR data signal having a high data rate that is greater than the low data rate are received.

At 710, a light source is modulated based on logic levels of the HR data signal and logic levels of the LR data signal to produce modulated light that concurrently conveys or carries, e.g., comprises, the logic levels of the LR data signal and the logic levels of the HR data signal.

Figure 8:
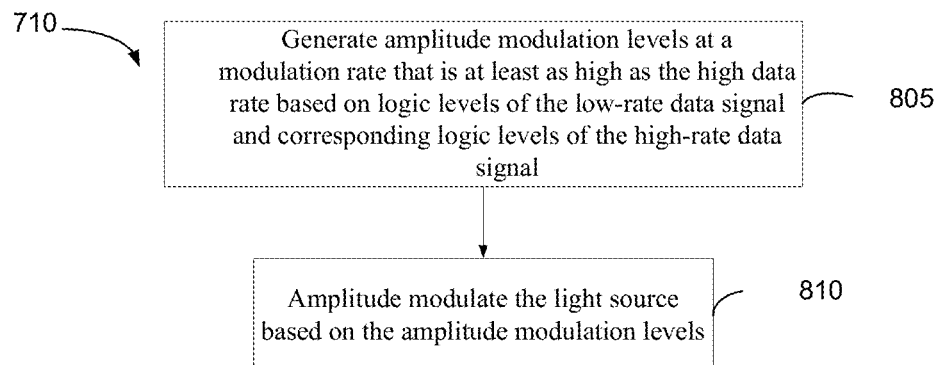
FIG. 8 is a flowchart expanding on a modulating process introduced in FIG. 7, according to an embodiment.

FIG. 8 is a flowchart expanding on how the light is modulated at 710 above, according to an embodiment.

At 805, light amplitude modulation levels are generated, at a modulation rate that is at least as high as the high data rate of the high data rate signal, based on logic levels of the LR data signal and corresponding logic levels of the HR data signal.

At 810, the light source is amplitude modulated based on the amplitude modulation levels.

Figure 9:
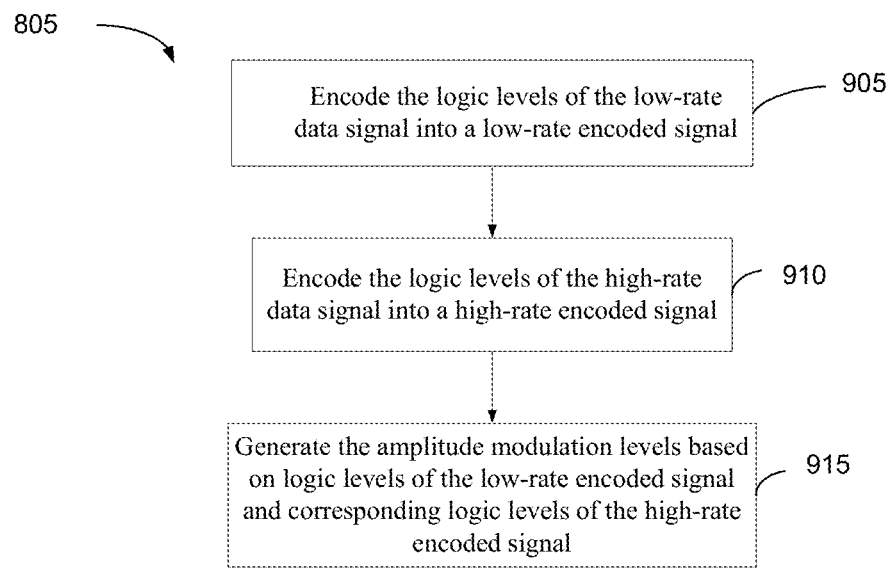
FIG. 9 is a flowchart expanding on generating amplitude modulation levels introduced in FIG. 8, according to an embodiment.

FIG. 9 is a flowchart expanding on how the amplitude modulation levels are generated at 805 above, according to an embodiment.

At 905, the logic levels of the LR data signal are encoded into a LR encoded signal. The LR data signal logic levels may be encoded as FSK frequencies, e.g., as FSOOK frequencies.

At 910, the logic levels of the HR data signal are encoded into a HR encoded signal. The HR logic levels may be Manchester encoded.

At 915, the amplitude modulation levels are generated based on logic levels of the LR encoded signal and corresponding logic levels of the HR encoded signal. For example, the logic levels of the LR encoded signal may be combined with corresponding logic levels of the HR data signal to produce the amplitude modulation levels.

Figure 10:
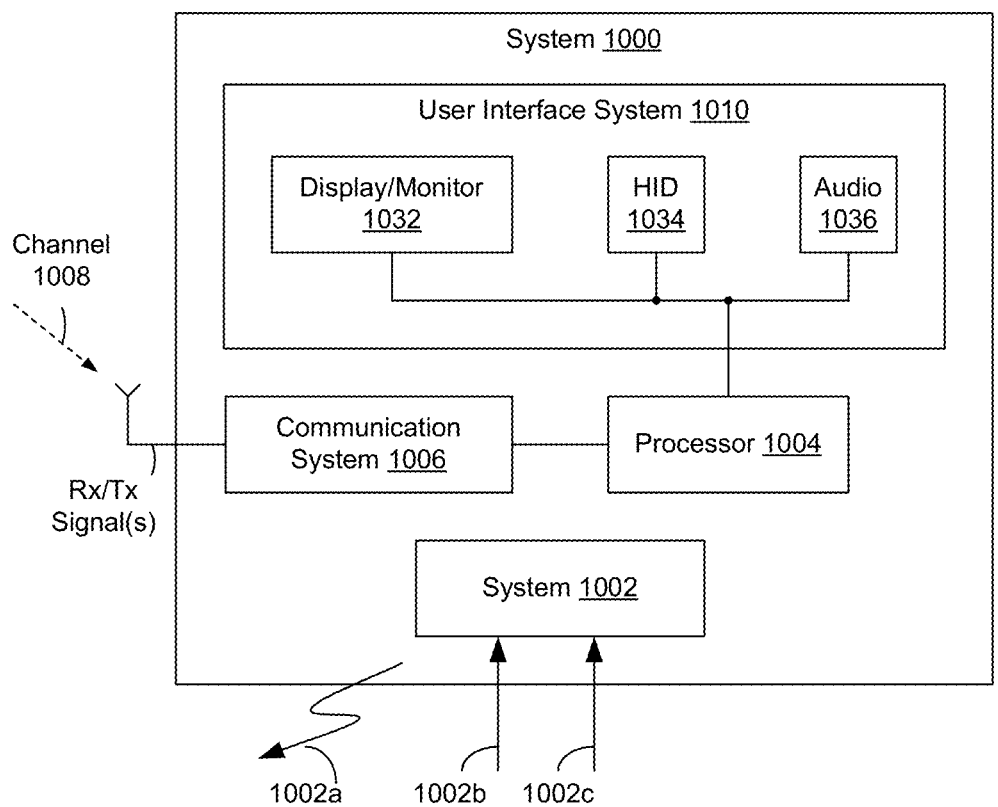
FIG. 10 is a block diagram of a system including a system to generate and transmit a modulated light signal to concurrently convey logic levels of a low-rate data signal and logic levels of a high-rate data signal, according to an embodiment.

FIG. 10 is a block diagram of a system 1000 including a system or apparatus 1002 to generate and transmit a modulated light signal 1002*a* to concurrently convey logic levels of a LR data signal 1002*b* and logic levels of a HR data signal 1002*c*.

System 1002 may be implemented as described in one or more examples herein.

System 1000 may include a processor 1004.

System 1000 may include a communication system 1006 to interface between processor system 1004 and a communication network. Communication system 1006 may include a wired and/or wireless communication system.

System 1000 or portions thereof may be implemented within one or more integrated circuit dies, and may be implemented as a system-on-a-chip (SoC).

System 1000 may include a user interface system 1010 to interface system 1010.

User interface system 1010 may include a monitor or display 1032 to display information from processor 1004.

User interface system 1010 may include a human interface device (HID) 1034 to provide user input to processor 1004. HID 1034 may include, for example and without limitation, one or more of a key board, a cursor device, a touch-sensitive device, and or a motion and/or image sensor. HID 1034 may include a physical device and/or a virtual device, such as a monitor-displayed or virtual keyboard.

User interface system 1010 may include an audio system 1036 to receive and/or output audible sound.

System 1000 may further include a transmitter system to transmit signals from system 1000.

System 1000 may correspond to, for example, a computer system, a personal communication device, and/or a television set-top box.

System 1000 may include a housing, and one or more of communication system 1002, digital processor system 1012, user interface system 1010, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1002 may be implemented to receive a digital television broadcast signal, and system 1000 may include a set-top box housing or a portable housing, such as a mobile telephone housing.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include one or more non-transitory mediums. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

Various method, apparatus, and system embodiments are described herein.

An apparatus embodiment comprises a light source and a light modulator. The light modulator is implemented to receive a low-rate data signal having a low data rate and a high-rate data signal having a high data rate that is greater than the low data rate, and modulate the light source based on logic levels of the high-rate data signal and logic levels of the low-rate data signal to produce modulated light that concurrently conveys the logic levels of the low-rate data signal and the logic levels of the high-rate data signal.

The light modulator includes an amplitude level generator to generate amplitude modulation levels at a modulation rate that is at least as high as the high data rate based on logic levels of the low-rate data signal and logic levels of the high-rate data signal, and amplitude modulate the light source based on the amplitude modulation states.

The light modulator further comprises a low-rate encoder to encode the logic levels of the low-rate data signal into a low-rate encoded signal, and a high-rate encoder to encode the logic levels of the high-rate data signal into a high-rate encoded signal, wherein the amplitude level generator is implemented to generate the amplitude modulation levels based on logic levels of the low-rate encoded signal and corresponding logic levels of the high-rate encoded signal. The corresponding logic levels of the low-rate encoded signal and the high-rate encoded signal may be concurrent.

The low-rate encoder may be implemented to encode the logic levels of the low-rate data signal as a frequency shift keying (FSK) signal having frequencies representing the logic levels of the low-rate data signal.

The FSK signal may be a frequency shift ON-OFF keying (FSOOK) signal including multiple ON-OFF waveform cycles at a first frequency to represent a logic zero of the low-rate data signal, and multiple ON-OFF waveform cycles at a second frequency to represent a logic one of the low-rate data signal.

The high-rate encoder may be implemented to encode the logic levels of the high-rate data signal as edge transitions in the high-rate encoded signal.

The high-rate encoder may be implemented to Manchester encode the high-rate data signal.

The light modulator may further comprise a low-rate encoder implemented to generate an FSK signal having frequencies representing the logic levels of the low-rate data signal, and a high-rate encoder to encode the logic levels of the high-rate data signal into a high-rate encoded signal, wherein the amplitude level generator is implemented to generate the amplitude modulation levels at the modulation rate as a combination of logic levels of the FSK signal with corresponding logic levels of the low-rate encoded signal.

A system embodiment comprises a communication system to communicate with a network, a processor to interface between the communication system and a user interface system, and a light transmitter. The light transmitter comprises a light source and a light modulator. The light modulator is implemented to receive a low-rate data signal having a low data rate and a high-rate data signal having a high data rate that is greater than the low data rate, and modulate the light source based on logic levels of the high-rate data signal and logic levels of the low-rate data signal to produce modulated light that concurrently conveys the logic levels of the low-rate data signal and the logic levels of the high-rate data signal. The system embodiment further comprises a housing, wherein the processor, the communication system, and the light transmitter are positioned within the housing.

The communication system may include a wireless communication system, and the housing may include a mobile hand-held housing to house the communication system, the processor, the user interface system, and a battery.

The light modulator may include an amplitude level generator to generate amplitude modulation levels at a modulation rate that is at least as high as the high data rate based on logic levels of the low-rate data signal and logic levels of the high-rate data signal, and amplitude modulate the light source based on the amplitude modulation states.

The light modulator further comprises a low-rate encoder to encode the logic levels of the low-rate data signal into a low-rate encoded signal, and a high-rate encoder to encode the logic levels of the high-rate data signal into a high-rate encoded signal, wherein the amplitude level generator is implemented to generate the amplitude modulation levels based on logic levels of the low-rate encoded signal and corresponding logic levels of the high-rate encoded signal.

A method embodiment comprises receiving a low-rate data signal having a low data rate, and receiving a high-rate data signal having a high data rate that is greater than the low data rate, and modulating a light source based on logic levels of the high-rate data signal and logic levels of the low-rate data signal to produce modulated light that concurrently conveys the logic levels of the low-rate data signal and the logic levels of the high-rate data signal.

The modulating may comprise generating amplitude modulation levels at a modulation rate that is at least as high as the high data rate based on logic levels of the low-rate data signal and corresponding logic levels of the high-rate data signal, and amplitude modulating the light source based on the amplitude modulation levels.

The generating may further comprise encoding the logic levels of the low-rate data signal into a low-rate encoded signal, encoding the logic levels of the high-rate data signal into a high-rate encoded signal, and generating the amplitude modulation levels based on logic levels of the low-rate encoded signal and corresponding logic levels of the high-rate encoded signal.

The encoding of the low-rate data signal may comprise encoding the logic levels of the low-rate data signal as a frequency shift keying (FSK) signal having frequencies representing the logic levels of the low-rate data signal.

The FSK signal may be a frequency shift ON-OFF keying (FSOOK) signal including multiple ON-OFF cycles at a first frequency to represent a logic zero of the low-rate data signal, and multiple ON-OFF cycles at a second frequency to represent a logic one of the low-rate data signal.

The encoding of the high-rate data signal may comprise encoding the logic levels of the high-rate data signal as edge transitions in the high-rate encoded signal.

The encoding of the high-rate signal may further comprise Manchester encoding of the logic levels of the high-rate data signal.

The generating may include encoding the logic levels of the low-rate data signal as frequencies of a frequency shift ON-OFF keying (FSOOK) signal, encoding the logic levels of the high-rate data signal into a high-rate encoded signal, and combining, at the modulation rate, logic levels of the FOOSK signal with corresponding logic levels of the low-rate encoded signal to produce the amplitude modulation levels.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. An apparatus, comprising:
a light source and a light modulator, wherein the light modulator includes:
a low-rate encoder configured to encode logic levels of a low-rate data signal having a low data rate into a low-rate encoded signal;
a high-rate encoder configured to encode logic levels of a high-rate data signal having a high data rate that is greater than the low data rate into a high-rate encoded signal; and
an amplitude level generator configured to modulate the light source based on logic levels of the high-rate data signal and logic levels of the low-rate data signal to produce modulated light that concurrently conveys the logic levels of the low-rate data signal and the logic levels of the high-rate data signal,
wherein the amplitude level generator is configured to generate amplitude modulation levels at a modulation rate that is at least as high as the high data rate based on logic levels of the low-rate data signal and logic levels of the high-rate data signal, and to amplitude modulate the light source based on the amplitude modulation levels, and wherein the amplitude level generator is further configured to generate the amplitude modulation levels based on logic levels of the low-rate encoded signal and corresponding logic levels of the high-rate encoded signal.

2. The apparatus of claim 1, wherein the low-rate encoder is configured to encode the logic levels of the low-rate data signal as a frequency shift keying (FSK) signal having frequencies representing the logic levels of the low-rate data signal.

3. The apparatus of claim 2, wherein the low-rate encoder is further configured to encode the logic levels of the low-rate data signal as a frequency shift ON-OFF keying (FSOOK) signal to have,
multiple ON-OFF waveform cycles at a first frequency to represent a logic zero of the low-rate data signal, and
multiple ON-OFF waveform cycles at a second frequency to represent a logic one of the low-rate data signal.

4. The apparatus of claim 1, wherein the high-rate encoder is configured to encode the logic levels of the high-rate data signal as edge transitions in the high-rate encoded signal.

5. The apparatus of claim 4, wherein the high-rate encoder is further configured to Manchester encode the high-rate data signal.

6. The apparatus of claim 1, wherein:
the low-rate encoder is configured to generate an FSK signal that has frequencies to represent the logic levels of the low-rate data signal; and
the high-rate encoder is configured to encode the logic levels of the high-rate data signal into a high-rate encoded signal;
wherein the amplitude level generator is configured to generate the amplitude modulation levels at the modulation rate as a combination of logic levels of the FSK signal with corresponding logic levels of the low-rate encoded signal.

7. A system, comprising: a communication system to communicate with a network, and a processor to interface with between the communication system and a user interface system, wherein the communication system includes:
a light transmitter, that includes a light source and a light modulator to, and wherein the light modulator includes:
a low-rate encoder configured to encode logic levels of a low-rate data signal having a low data rate a-lag into a low-rate encoded signal;
a high-rate encoder configured to encode logic levels of a high-rate data signal having a high data rate that is greater than the low data rate into a low-rate encoded signal; and
an amplitude level generator configured to modulate the light source based on logic levels of the high-rate data signal and logic levels of the low-rate data signal to produce modulated light that concurrently conveys the logic levels of the low-rate data signal and the logic levels of the high-rate data signal, and
wherein the amplitude level generator is configured to generate amplitude modulation levels at a modulation rate that is at least as high as the high data rate based on logic levels of the low-rate data signal and logic levels of the high-rate data signal, and amplitude modulate the light source based on the amplitude modulation levels, and
wherein the amplitude level generator is further configured to generate the amplitude modulation levels based on logic levels of the low-rate encoded signal and corresponding logic levels of the high-rate encoded signal.

8. The system of claim 7, wherein the communication system includes a wireless communication system, the system further including:
a mobile hand-held housing to hold the communication system, the processor, the user interface system, and a battery.

9. The system of claim 7, wherein the low-rate encoder is configured to encode the logic levels of the low-rate data signal as a frequency shift keying (FSK) signal having frequencies representing the logic levels of the low-rate data signal.

10. The system of claim 9, wherein the low-rate encoder is further configured to encode the logic levels of the low-rate data signal as a frequency shift ON-OFF keying (FSOOK) signal to have,
multiple ON-OFF waveform cycles at a first frequency to represent a logic zero of the low-rate data signal, and
multiple ON-OFF waveform cycles at a second frequency to represent a logic one of the low-rate data signal.

11. The system of claim 7, wherein the high-rate encoder is configured to encode the logic levels of the high-rate data signal as edge transitions in the high-rate encoded signal.

12. The system of claim 11, wherein the high-rate encoder is further configured to Manchester encode the high-rate data signal.

13. A method, comprising:
encoding logic levels of a low-rate data signal having a low data rate into a low-rate encoded signal;
encoding logic levels of a high-rate data signal having a high data rate that is greater than the low data rate into a high-rate encoded signal; and
modulating a light source based on logic levels of the high-rate data signal and logic levels of the low-rate data signal to produce modulated light that concurrently conveys the logic levels of the low-rate data signal and the logic levels of the high-rate data signal,
wherein the modulating includes generating amplitude modulation levels at a modulation rate that is at least as high as the high data rate based on logic levels of the low-rate data signal and corresponding logic levels of the high-rate data signal, and amplitude modulating the light source based on the amplitude modulation levels, and
wherein the generating amplitude modulation levels includes generating the amplitude modulation levels based on logic levels of the low-rate encoded signal and corresponding logic levels of the high-rate encoded signal.

14. The method of claim 13, wherein the encoding logic levels of a low-rate data signal includes encoding the logic levels of the low-rate data signal as a frequency shift keying (FSK) signal having frequencies representing the logic levels of the low-rate data signal.

15. The method of claim 14, wherein the encoding logic levels of a low-rate data signal further includes encoding the logic levels of the low-rate data signal as a frequency shift ON-OFF keying (FSOOK) signal having,
multiple ON-OFF cycles at a first frequency to represent a logic zero of the low-rate data signal, and
multiple ON-OFF cycles at a second frequency to represent a logic one of the low-rate data signal.

16. The method of claim 13, wherein the encoding logic levels of a high-rate data signal includes encoding the logic levels of the high-rate data signal as edge transitions in the high-rate encoded signal.

17. The method of claim 16, wherein the encoding logic levels of a high-rate signal further includes Manchester encoding the logic levels of the high-rate data signal.

18. The method of claim 13, wherein the generating amplitude modulation levels further includes:
- encoding the logic levels of the low-rate data signal as frequencies of a frequency shift ON-OFF keying (FSOOK) signal;
- encoding the logic levels of the high-rate data signal into a high-rate encoded signal; and
- combining, at the modulation rate, logic levels of the FOOSK signal with corresponding logic levels of the low-rate encoded signal to produce the amplitude modulation levels.

* * * * *

UNITED STATES PATENT AND TRADEMARK OFFICE
CERTIFICATE OF CORRECTION

| | | |
|---|---|---|
| PATENT NO. | : 8,818,204 B2 | Page 1 of 1 |
| APPLICATION NO. | : 13/460224 | |
| DATED | : August 26, 2014 | |
| INVENTOR(S) | : Richard D. Roberts | |

It is certified that error appears in the above-identified patent and that said Letters Patent is hereby corrected as shown below:

In the Drawings

On Sheet 1 of 8, Reference Numeral 118, FIG. 1, Delete "HIgh" and insert -- High --, therefor.

In the Claims

Column 11, line 43, Claim 7, after "between" delete "the".

Column 11, line 45, Claim 7, delete "transmitter," and insert -- transmitter --, therefor.

Column 11, line 46, Claim 7, after "modulator" delete "to,".

Column 11, line 48, Claim 7, after "rate" delete "a-lag".

Column 11, line 59, Claim 7, after "signal," delete "and".

Column 13, line 12, Claim 18, delete "FOOSK" and insert -- FSOOK --, therefor.

Signed and Sealed this
Thirtieth Day of December, 2014

Michelle K. Lee
*Deputy Director of the United States Patent and Trademark Office*